Patented July 11, 1939

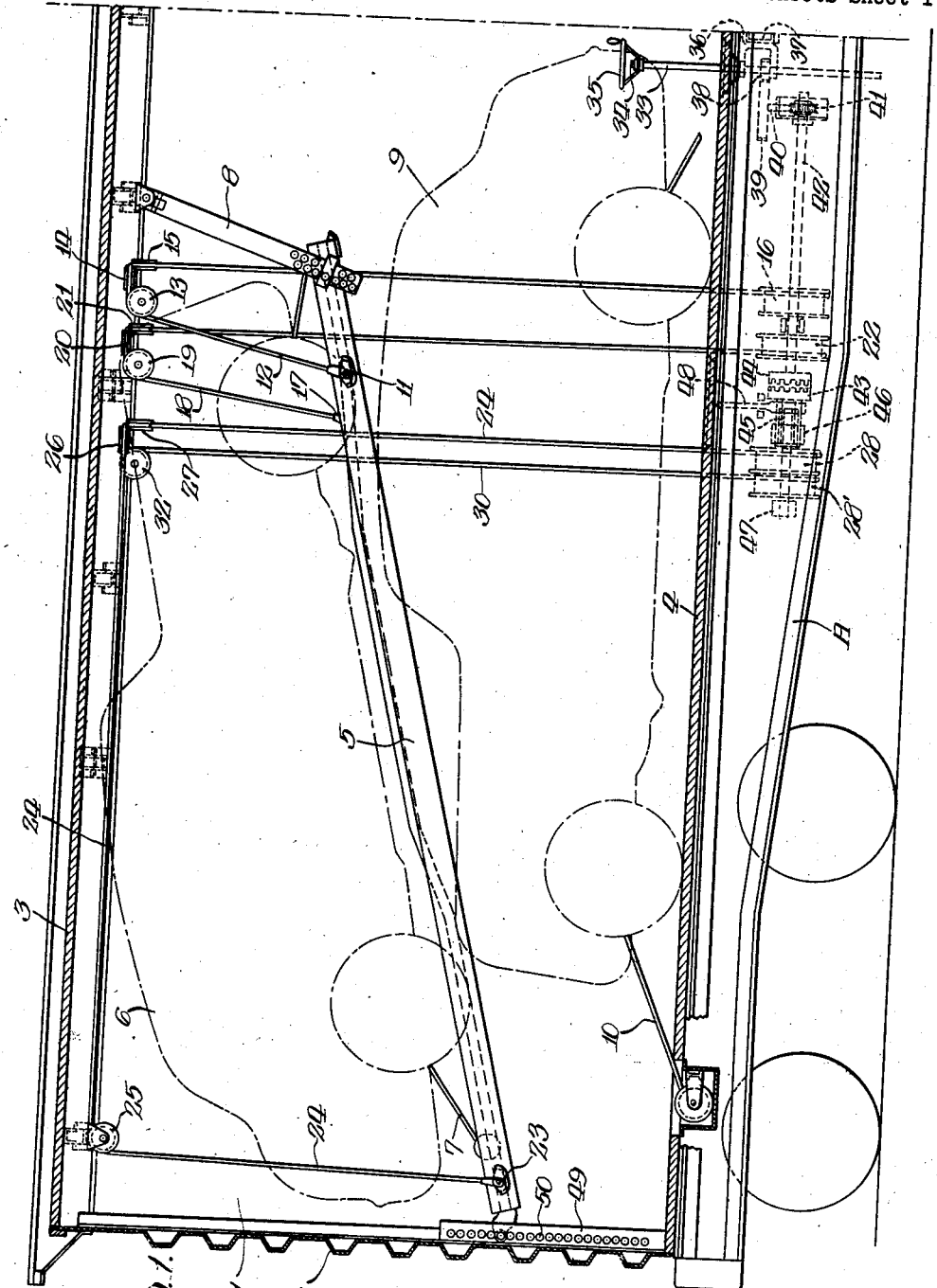
July 11, 1939.    W. S. HELMER    2,165,376
AUTOMOBILE SUPPORTING MEANS
Filed Sept. 7, 1937    2 Sheets-Sheet 1
Inventor:
Walter S. Helmer

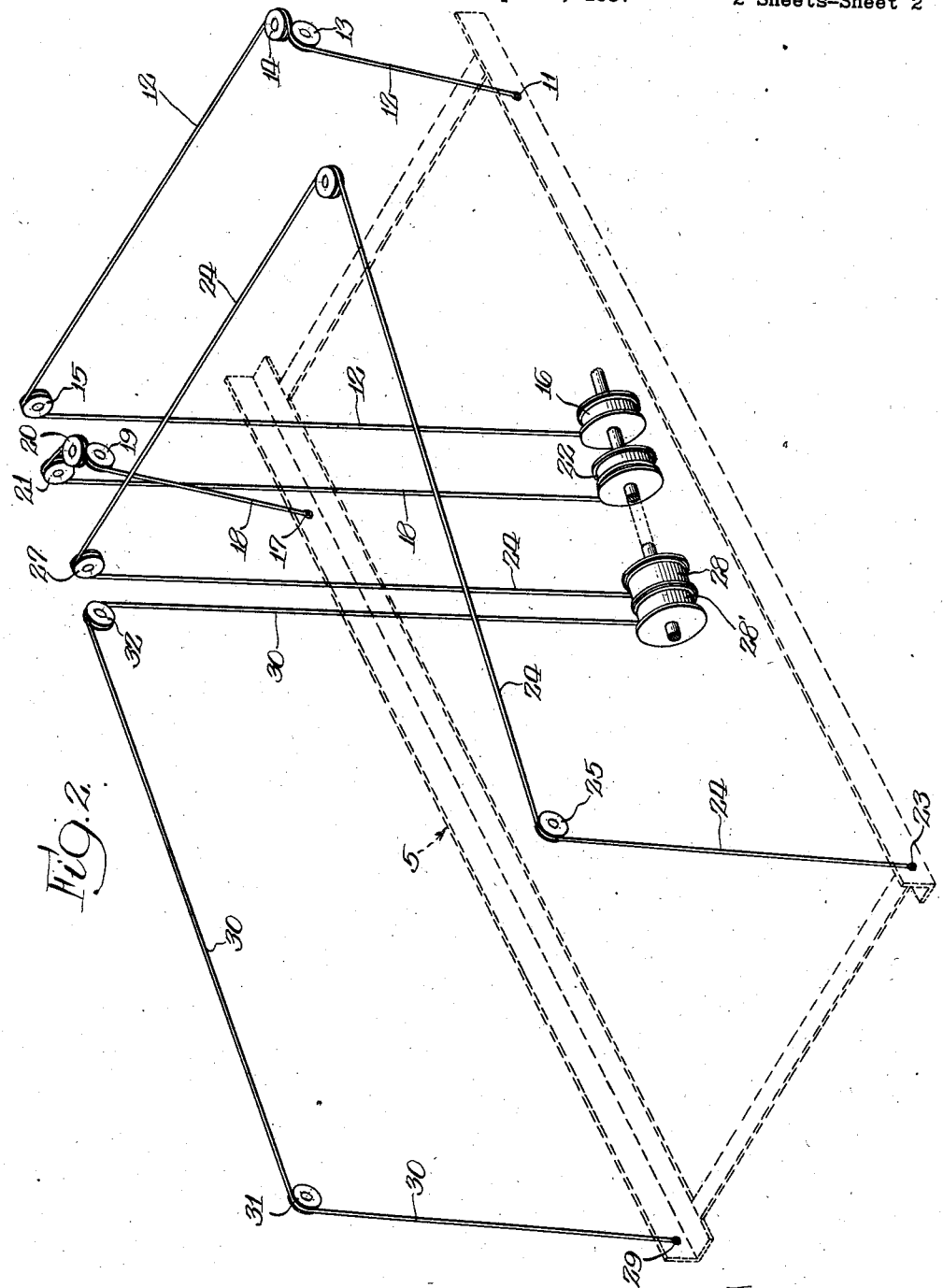

2,165,376

UNITED STATES PATENT OFFICE 2,165,376

AUTOMOBILE SUPPORTING MEANS

Walter S. Helmer, Oak Park, Ill.

Application September 7, 1937, Serial No. 162,803

6 Claims. (Cl. 105—368)

My invention relates to means for supporting automobiles for transportation in freight cars and particularly to novel means for raising a deck within the car which deck supports an automobile.

One of the chief features of my invention is an arrangement of cables secured to the deck and hoisting mechanism for raising a deck, which mechanism is located under the floor of the car. Briefly, the arrangement comprises four cables, one connected to each corner of the deck, the cables running over pulleys located adjacent the roof of the car and thence downward to drums associated with the hoisting mechanism under the floor of the car.

Preferably in the use of my invention four automobiles are supported in a car for transportation, two on the floor back to back and two tilted or semi-decked in the car, one at each end of the car. The tilted decked automobiles have their rear ends adjacent the ends of the car and their front ends elevated adjacent the roof. I do not claim as novel this arrangement of four automobiles in a freight car, it having been common practice to load four automobiles as described fifteen or more years ago in shipments from the eastern parts of the country to Pacific Coast points and elsewhere. In the drawings I have only shown half of a freight car with two automobiles therein, one tilted and the other on the floor of the car. It being mere duplication to provide two other automobiles similarly arranged in the car, it is unnecessary as far as my invention is concerned to show the third and fourth automobile.

The object of my invention is to provide a simple, rugged and inexpensive mechanism for loading automobiles in freight cars which permits free entrance through a door of the car, does not endanger the life of the operator while the decks are being tilted or raised to the roof of the car and prevents damage to automobiles while being loaded.

It will be understood that various changes and modifications may be made in the mechanisms as shown in the drawings without departing from the spirit of my invention and that the same are submitted simply for illustrative purposes and not in a limiting sense, the scope of the invention being defined in the following claims.

In the accompanying drawings in which like numerals and letters of reference indicate similar parts throughout the several views:

Figure 1 is a side elevation of half a freight car showing therein two automobiles in semi-decked position, and Figure 2 is a diagrammatic showing of the cable and drum arrangement.

Referring to the drawings, 1 represents the sides of a freight car, 2 the ends of the car, 3 the roof, 4 the floor, and A the underframe generally. 6 is an automobile supported in elevated position upon a deck 5, 7 represents tie-downs for securing the automobile upon the deck, 8 a suspension arm for supporting the deck in tilted position, 9 an automobile loaded under the tilted automobile and 10 represents tie-downs for automobile 9.

The deck 5, tie-downs 7, suspension arm 8, tie-downs 10 and indexing medium 49 do not in themselves form a part of this invention, these particular features forming a part of a co-pending application filed by Ernest W. Henry and myself, Serial No. 162,802, filed November 5, 1937.

The cable arrangement for raising the deck is as follows: Attached to the front end of the side frame members of the deck at 11 is a cable 12 which runs over a pulley 13 parallel to the car side, thence over a pulley 14 at right angles to the car side and thence over pulley 15 parallel to the car end and thence downwardly to drum 16. Attached to the front end of the other side frame member of the deck at 17 is a cable which runs upwardly over pulley 19 parallel to the car side, thence over pulley 21 parallel to the car end and thence downwardly to drum 22. The cable attachment for the rear end of the deck is as follows: Attached at 23 to the side frame member is a cable 24 which runs over pulley 25 parallel to the roof, thence over pulley 27 positioned parallel to the car end and thence downwardly to drum 28. The fourth cable is attached at 29 to the end of the opposite side frame member and is designated by 30. This cable runs over pulleys 31 and 32, both of which are parallel to the car side and thence down to drum 28'.

To operate the pulleys I have provided the following mechanism: A staff 33 having a top portion 34 and a hand wheel 35 is journaled in a bracket 36 suitably attached to a part 37 of the car. Attached to the bracket 36 but permitted to revolve with the staff 33, is a pinion 38 which meshes with a gear 39 which in turn has a shaft with worm gear 40 meshing with gear 41. This particular mechanism thus described forms no part of this invention but is included in the above referred to Henry-Helmer co-pending application. A shaft 42 revolves with gear 41 and this shaft has upon it two drums 16 and 22. 43 and 44 is a positive clutch mechanism, 45 a spline shaft, 46 and 47 are bearings and 48 designates a clutch operating handle, all of which is suitably supported by underframe A.

By means of the above described hoisting and clutch mechanism and the cable arrangement previously described, it is possible through the operation of staff 33 to raise the deck horizontally or to tilt the deck horizontally of the car as shown by Figure 1. These operations are as follows: To raise the deck horizontally clutch operating lever 40 is shifted to engage positive clutch members 43 and 44. Under these conditions, when hoisting mechanism is operated by means of staff 33 and handle 35, shaft 42 revolves, turning drums 16, 22, 28 and 28', thus winding upon them cables 12, 18, 24 and 30, through positive clutch 43 and 44 and spline shaft 45.

To tilt the front end of the deck clutch operating lever 48 is shifted to disengage clutch members 43 and 44. Under these conditions shaft 42 revolves, turning the drums 16 and 22 only, winding upon them cables 12 and 18, while the rear drums 28 and 28' remain stationary. The rear end of the deck cannot be raised independently of the front end.

Instead of the manual operation through medium of staff 33 and handle 35, a motor may be employed to revolve staff 33 without any change of the hoisting mechanism as disclosed in the above referred to Helmer-Henry co-pending application.

The operation of the device is as follows: Before any loading of automobiles is started the deck 5 rests near the roof. It is then lowered horizontally as a whole as previously described, until its rear end is high enough to be indexed through the medium of indexing bars 49, which indexing bars have holes 50 for height adjustment. In other words, when the deck is lowered to this position its rear end is pivotally supported between the indexing bars 49. This indexing feature is also a part of the above referred to Helmer-Henry co-pending application and no detail of it here is thought necessary. The front end of the deck is then lowered and an automobile is backed upon it, this being possible due to the fact that the deck has two continuous runways, as disclosed in the Helmer-Henry application. By means of the clutch and winding arrangement previously described, cables 12 and 18 are wound upon drums 16 and 22, thus elevating the front end of the deck and the deck is held in this tilted position by bars 8. Thereon an automobile, designated by 9, is run under the deck, the front end of this automobile being adjacent the end of the car.

When the freight car is to be used for other purposes, the deck is elevated to the roof through the medium of cables 12, 18, 24 and 30 as previously described and held in that position by any suitable means.

From the above it will be seen that none of the hoisting mechanism is at the doorway of the car and hence free entrance of automobiles through the door is permitted. Also it will be noted that the winding mechanism, whether operated manually or by motor, is beyond the decks and hence the operator is in no danger should the decks accidentally fall. Also there being no hoisting mechanism in the car adjacent the automobiles, there is no danger of damage being done to the automobiles while being loaded.

What I desire to secure and protect by Letters Patent of the United States is:

1. In mechanism for elevating an automobile in a freight car, a rectangular shaped deck upon which an automobile is supported, a flexible member attached to each corner of the deck, pulleys located adjacent the roof of the car over which said flexible members pass, two sets of winding drums fixed to the car body, one set of which is adapted to wind thereon the two flexible members attached to the rear corners of the deck and the other set of which is adapted to wind thereon the two flexible members attached to the front corners of the deck, clutch mechanism associated with the two sets of drums adapted to connect or disconnect the two sets of drums, a shaft for said drums and means to rotate said shaft whereby both sets of drums may be revolved simultaneously to wind thereon the flexible members to raise the deck or one set of drums may be independently revolved to wind thereon flexible members to raise the front end only of the deck.

2. In a mechanism for elevating an automobile in a freight car, a rectangular shaped deck upon which an automobile is supported, a flexible member attached to each corner of the deck, pulleys located adjacent the roof of the car over which said flexible members pass, two sets of winding drums fixed to the car body, one set of which is adapted to wind thereon the two flexible members attached to the rear corners of the deck and the other set of which is adapted to wind thereon the two flexible members attached to the front corners of the deck, clutch mechanism associated with the two sets of drums adapted to disconnect the two sets of drums, a shaft for said drums and means to rotate said shaft whereby one set only of the drums may be revolved to wind thereon the flexible members attached to the front end of the deck to raise that end only.

3. In mechanism for elevating an automobile in a freight car, a rectangular shaped deck upon which an automobile is supported, a flexible member attached to each corner of the deck, pulleys located adjacent the roof of the car over which said flexible members pass, two sets of winding drums fixed to the car body, one set of which is adapted to wind thereon the two flexible members attached to the rear corners of the deck and the other set of which is adapted to wind thereon the two flexible members attached to the front corners of the deck, clutch mechanism associated with the two sets of drums, adapted to disconnect the two sets of drums, a shaft for said drums, means to pivotally connect the rear end of the deck to an end of the car and means to rotate said shaft whereby one set only of the drums may be revolved to wind thereon the flexible members attached to the front end of the deck to raise that end only.

4. In mechanism for elevating an automobile in a freight car, a rectangular shaped deck upon which an automobile is supported, a flexible member attached to each corner of the deck, pulleys located adjacent the roof of the car over which said flexible members pass, two sets of winding drums fixed to the car body, one set of which is adapted to wind thereon the two flexible members attached to the rear corners of the deck and the other set of which is adapted to wind thereon the two flexible members attached to the front corners of the deck, clutch mechanism associated with the two sets of drums adapted to connect or disconnect the two sets of drums, a shaft for said drums, means to pivotally connect the rear end of the deck to an end of the car, means to rotate said shaft whereby one set only of the drums may be revolved to wind thereon the flexible members attached to the front end of the deck to raise that end only or both drums may be revolved simultaneously to wind thereon the flexible members to raise the deck as an entirety and means to support said raised end adjacent the roof of the car.

5. In mechanism for elevating an automobile in a freight car, a rectangular shaped deck upon which an automobile is supported, a flexible member attached to each corner of the deck, pulleys located adjacent the roof of the car over which said flexible members pass, two sets of winding drums fixed to the car body, one set of which is adapted to wind thereon the two flexible members attached to the rear corners of the deck and the other set of which is adapted to wind thereon the two flexible members attached to the front corners of the deck, clutch mechanism associated with the two sets of drums adapted to connect the two sets of drums, a shaft for said drums and means within said car and extending through the car floor to rotate said shaft whereby both sets of drums may be revolved simultaneously to wind thereon the flexible members to raise the deck.

6. In mechanism for elevating an automobile in a freight car, a rectangular shaped deck upon which an automobile is supported, a flexible member attached to each corner of the deck, pulleys located adjacent the roof of the car over which said flexible members pass, two sets of winding drums fixed to the car body, one set of which is adapted to wind thereon the two flexible members attached to the rear corners of the deck and the other set of which is adapted to wind thereon the two flexible members attached to the front corners of the deck, clutch mechanism associated with the two sets of drums adapted to disconnect the two sets of drums, a shaft for said drums and means within said car and extending through the car floor to rotate said shaft whereby one set only of the drums may be revolved to wind thereon the two flexible members attached to the front end of the deck to raise that end only.

WALTER S. HELMER.